United States Patent [19]

Heath

[11] 4,278,043
[45] Jul. 14, 1981

[54] SEAT BELT LOAD INDICATOR

[75] Inventor: Robert B. Heath, Lonsdale, Australia

[73] Assignee: Rainsfords Metal Products Pty. Ltd., Lonsdale, Australia

[21] Appl. No.: 92,073

[22] Filed: Nov. 7, 1979

[30] Foreign Application Priority Data

Nov. 24, 1978 [AU] Australia .............................. PD6906

[51] Int. Cl.³ .......................... B60Q 9/00; G01L 5/06
[52] U.S. Cl. ................................. 116/28 R; 116/212; 280/801
[58] Field of Search ....................... 116/212, 56, 28 R; 280/801, 805; 297/468, 472; 188/1 C

[56] References Cited

U.S. PATENT DOCUMENTS

| | | | |
|---|---|---|---|
| 3,428,362 | 2/1969 | Bertelson | 297/468 |
| 3,438,674 | 4/1969 | Radke | 188/1 C |
| 3,749,205 | 7/1973 | Fletcher | 297/472 |
| 4,111,459 | 9/1978 | Magyar | 297/468 |
| 4,129,321 | 12/1978 | Garvey | 280/801 |

FOREIGN PATENT DOCUMENTS 2811199  9/1979  Fed. Rep. of Germany ........... 280/801

*Primary Examiner*—Gerald Goldberg
*Assistant Examiner*—Denis E. Corr
*Attorney, Agent, or Firm*—Norbert P. Holler

[57] ABSTRACT

A seat belt assembly provided with belt webbing, a bracket, a buckle, and a tongue co-operable with the buckle, and one of the bracket, buckle, or tongue is provided with a distortion area which is under stress when the assembly is strained to the first stage of overload.

3 Claims, 7 Drawing Figures

SEAT BELT LOAD INDICATOR

This invention relates to a seat belt assembly which incorporates an overload indicator for indicating when the belt assembly has been subjected to a first stage of overload.

BACKGROUND OF THE INVENTION

A serious problem which is encountered with seat belt assemblies and which has been well recognised but not yet solved is that a seat belt assembly can be loaded with what is herein termed the "first stage of overload", and which can for example be nine kilonewtons although at this time no numerical load has been identified by authorities. When so loaded, it is possible for the webbing to become strained or the latching mechanism to be damaged to a point where absolute security is uncertain and the seat belt should be replaced. Such a situation can occur for example if a vehicle is involved in a minor accident and the seat belt assembly has "held", protecting a wearer against displacement, and it is important that the wearer should be able to subsequently release that belt. There is of course a second stage of overload which occurs beyond the first stage of overload wherein the belt will become obviously damaged and unworkable.

The main object of this invention is to provide means whereby the seat belt assembly can be readily identified as having been subjected to the first stage of overload even though it is still operable.

BRIEF SUMMARY OF THE INVENTION

In this invention a seat belt assembly is provided with belt webbing, a bracket, a buckle, and a tongue cooperable with the buckle, and one of the bracket, buckle, or tongue is provided with a distortion area which is under stress when the assembly is strained to the first stage of overload.

The distortion area is of such shape and dimension that it is permanently distorted to such an extent that the assembly is readily identifiable as having been subjected to that first stage of overload. However, the location and the dimensions of the distortion area are such that the assembly remains operable between the first stage of overload and a second stage of overload greatly exceeding the first stage. The term "second stage of overload" is intended herein to mean that stage of overload at which the belt assembly becomes completely inoperable.

It will immediately be clear that there are varying places in the assembly where the distortion area can be located, and that the distortion can be a bending of metal, a shearing of metal, or a deformation whereby metal is caused to flow. Conveniently the distortion area can be located in a plate like portion of one of the bracket, buckle or tongue.

By utilising a distortion area, the relative location of tongue and buckle can be arranged to vary by an amount which is readily identifiable, but the arrangement can easily be such that, after distortion by that amount, the assembly continues to function in the normal way.

BRIEF DESCRIPTION OF THE DRAWINGS

Several embodiments of the invention are described hereunder in some detail with reference to and are illustrated in the accompanying drawings in which.

DETAILED DESCRIPTION OF THE PREFERRED EMBODIMENTS

Figure 1:
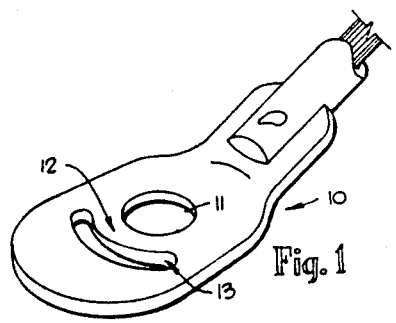
FIG. 1 is a fragmentary perspective view of the anchoring device of a buckle embodying the distortion area therein.

FIG. 1 illustrates a mounting bracket for mounting a buckle to the floor of a vehicle (although the invention can equally well be applied to a mounting bracket for mounting at a high location, for example, the centre pillar or the rear pillar of a mounting body). The bracket 10 is provided with an aperture 11 for receiving a securing bolt, and a distortion area 12 is formed by walls of a slot 13, which said walls are spaced a short distance away from the walls of aperture 11. The distortion area 12 is placed under considerable stress when the seat belt is strained to the first stage of overload, and the shape and dimension of the area 12 is carefully calculated, so that it will be subject to bending, causing one wall of slot 13 to close toward the other, but the securing bolt will of course remain in the (now enlarged) aperture 11 so that the assembly remains operable between the first stage of overload and the second stage of overload which greatly exceeds the first stage wherein the assembly is damaged to the point that it becomes inoperable for further use. By simple inspection of the bracket 10 it will immediately become evident that the first stage of overload has been reached, thereby being identifiable to an inspector that the assembly should be discarded and replaced with a new one.

Figure 2:
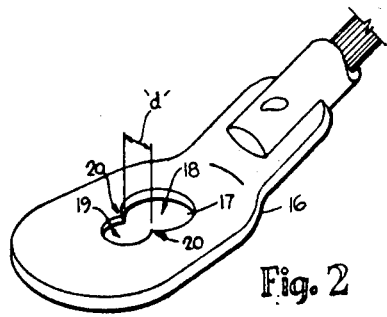
FIG. 2 is a similar fragmentary perspective view illustrating a second embodiment wherein the distortion area will be subjected to metal flow.

FIG. 2 shows a second embodiment which is a slight variation of the first, wherein the bracket 16 contains an aperture 17 defined by walls to be of "key-hole" shape, that is the aperture 17 has a relatively large portion 18 and a relatively small portion 19 extending into it. However, where the walls of the relatively small portion 19 meet the walls of the relatively large portion 18, the distance "d" between them is the minimum space between the slot walls such that upon straining to the first stage of overload, the slot walls are caused to strain apart by a metal flow (rather than by metal bending) and the stem of the securing bolt is then located in the relatively small portion 19 instead of the relatively large portion 18. This again is easily and clearly identifiable by inspection, but once again it will be seen that the location and dimensions of the distortion area (designated 20) are such that the assembly remains operable notwithstanding that the assembly has been strained to the first stage of overload.

Figure 3:
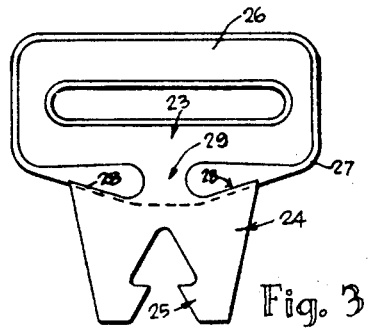
FIG. 3 is a plan view of a tongue having a distortion area which will be subject to bending.

In the third embodiment of FIG. 3 a distortion area 23 is in a tongue 24. The tongue 24 is arranged at its insertion end 25 to be inserted into a buckle and at its belt end 26 to support a belt, the distortion area 23 being a short beam extending between the ends 25 and 26 which said beam will bend when subjected to the first stage of overload. However, further bending is inhibited by the width of the beam at the belt end 26. There is provided a cover 27 which normally obscures edges 28 of the insertion end 25 but upon bending of the distortion area 23 due to overload the edges 28 move outwardly away from the cover 27 so that the assembly is readily identifiable as having been subjected to the first stage of overload. A narrow neck of metal 29 joins the insertion end 25 to the distortion area 23.

Figure 4:
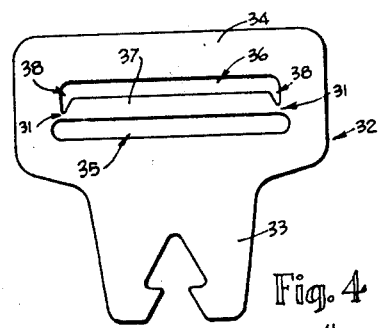
FIG. 4 is a plan view of a tongue wherein the distortion area is subject to distortion by shearing upon overload.

The fourth embodiment of FIG. 4 also has distortion areas 31 in a tongue 32, the tongue 32 also having an insertion end 33 and a belt end 34. Walls define the belt webbing receiving slot 35 through which the belt passes, and further walls define an adjacent slot 36 separated from the receiving slot 35 by a narrow load beam 37. The slot 36 has walls which are parallel for most of its length, but the ends 38 of slot 36 are widened by a reduction of the width of the load beam 3 so that the distortion areas 31 are relatively small in cross-section, the cross-sectional area being carefully calculated so that upon said first stage of overload being imposed on the seat belt assembly, the distortion areas 31 shear. Once again it will be seen that, by virtue of the dimensions of the end 34 of the tongue enlooped by the belt webbeing when the latter is received in the slot 35, the invention enables the belt assembly to remain operative beyond the first stage of overload right up to the second stage of overload, but once again it will be clear that the distortion of the distortion areas 31 due to the first stage of overload is readily identifiable.

Figure 5:
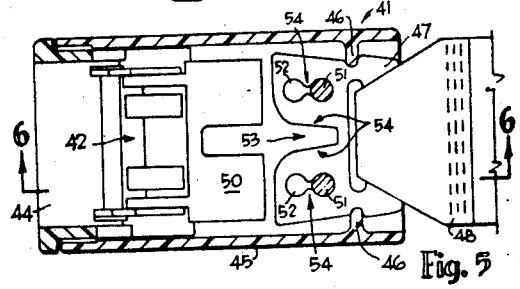
FIG. 5 illustrates a fifth embodiment wherein the distortion area is contained in the buckle and is subject to a combination of metal flow and bending upon overload.
Figure 6:
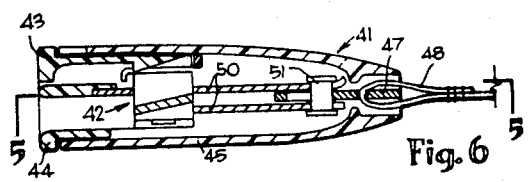
FIG. 6 is a section on line 6—6 of FIG. 5.
Figure 7:
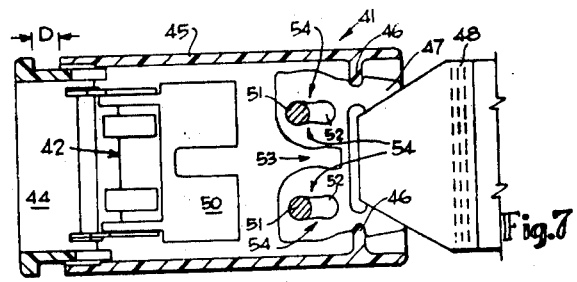
FIG. 7 is a view corresponding to FIG. 5 which shows the condition which exists after first stage of overload.

The above descriptions have described the distortion area as being in the bracket or the tongue, but it can alternatively be in the buckle itself and FIGS. 5, 6 and 7 illustrate a fifth embodiment wherein the buckle 41 is provided with a latching mechanism 42 controlled by a release slide 43. The buckle is provided with covers, there being a relatively small cover 44 on the mouth and a relatively large cover 45, which said large cover has inwardly facing ribs 46 which engage in notches defined in walls in the edge of the belt receiving plate 47, as seen best in FIG. 5. The belt 48 passes through a slot in the plate 47.

The plate 47 is secured to two spaced buckle plates 50 by rivets 51 and the rivets 51 pass through apertures 52 defined by walls having a figure "8" configuration as illustrated in FIG. 5. The central longitudinally extending slot 53 exists in the inner end of the belt receiving plate 47, and the walls of the slot 53 and the outer edge walls of the plate 57 cooperate with the apertures 52 to form four distortion areas all designated 54. These distortion areas 54 are caused to bend if the assembly is subjected to the first stage of overload as the edges of the figure "8" apertures 52 "cam" over the shanks of the rivets 51. In so doing, the large cover 45 is drawn rearwardly away from the mouth cover 44 by a distance designated "D" in FIG. 7 and this enables an inspector to identify the buckle as having been strained to the first stage of overload. If desired a message such as "BELT STRAINED-REPLACE" can be exposed to view through the space "D".

In the last described embodiment of FIGS. 5, 6 and 7 the slot 52 was provided with vertical walls of constant height, but as an alternative thereto, the walls can be coined intermediate their ends to provide inwardly facing projections which are distorted by metal flow upon overload of the assembly in its first stage of overload. In such a case it is not necessary to have the slot 53 since the metal on each side of the slots containing the rivets 51 is subject to much less bending.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. A vehicle safety seat belt assembly comprising belt webbing, a mounting bracket, a buckle, and a tongue cooperable with the buckle, said tongue having a first end providing walls defining a belt webbing receiving slot, a second end for insertion into said buckle, a distortion area of metal in the region of said first end proximate to said second end, and a narrow neck of metal joining said second end and said distortion area, said distortion area having such length, breadth and depth as to constitute a beam that bends and becomes permanently distorted when the belt assembly is subjected to a first stage of overload and provides an identifiable indication that the belt assembly has been subjected to said first stage of overload, but is not destroyed so that the belt assembly remains operable between said first stage of overload and a second stage of overload which greatly exceeds said first stage.

2. A vehicle safety seat belt assembly according to claim 1, wherein said second end of said tongue has a pair of transverse edges on opposite sides of said narrow neck and facing said distortion area, and a cover is secured to said first end of said tongue and has a portion normally overlying and obscuring said edges of said second end, the extent of such obscuring of said edges being such that upon bending of said beam under a first stage of overload said edges become visible beyond said cover and provide the indication that the belt assembly has been subjected to said first stage of overload.

3. A vehicle safety seat belt assembly comprising belt webbing, a mounting bracket, a buckle, and a tongue cooperable with said buckle, said tongue having first and second ends the latter of which is constructed for insertion into said buckle, said tongue in the region of said first end having first walls defining a belt webbing receiving slot and second walls defining a further slot in side by side relation with said belt webbing receiving slot, the portion of said end region of said tongue between said slots constituting a load beam over and around which said belt webbing extends when looped through said belt webbing receiving slot, said load beam at each of its ends having a respective portion of reduced width, constituting a distortion area, to enable said belt webbing, when the assembly is subjected to a first stage of overload, to shear the reduced width ends of said load beam and create an identifiable indication that the belt assembly has been subjected to said first stage of overload, and the portion of said end region on the side of said load beam remote from said belt webbing receiving slot and enlooped by said belt webbing being of sufficient dimensions and strength that the belt assembly remains operable between said first stage of overload and a second stage of overload which greatly exceeds said first stage.

* * * * *